United States Patent [19]

Bechara et al.

[11] 3,912,689
[45] Oct. 14, 1975

[54] DIALKYLAMINOALKYLIMIDAZOLES AS CATALYSTS FOR PREPARATION OF POLYURETHANES

[75] Inventors: Ibrahim Selim Bechara, Boothwyn; Dewey G. Holland, Chadds Ford, both of Pa.

[73] Assignee: Air Products and Chemicals, Inc., Allentown, Pa.

[22] Filed: May 8, 1974

[21] Appl. No.: 468,190

Related U.S. Application Data

[62] Division of Ser. No. 347,039, April 2, 1973, abandoned.

[52] U.S. Cl...... 260/75 NC; 260/2 EP; 260/2.5 AC; 260/309
[51] Int. Cl.² .......................................... C08G 18/20
[58] Field of Search... 260/77.5 AC, 75 NC, 2.5 AC

[56] References Cited
UNITED STATES PATENTS

| | | | |
|---|---|---|---|
| 3,177,223 | 4/1965 | Erner | 260/77.5 AC |
| 3,620,987 | 11/1971 | McLaughlin | 260/77.5 AC |
| 3,786,005 | 1/1974 | Bechara et al. | 260/77.5 AC |
| 3,833,525 | 9/1974 | Orlando et al. | 260/2.5 AC |

FOREIGN PATENTS OR APPLICATIONS

| | | | |
|---|---|---|---|
| 669,989 | 12/1938 | Germany | 260/309 |
| 1,486,817 | 6/1967 | France | 260/309 |

OTHER PUBLICATIONS

Chem. Abs., 1939, Vol. 33, Col. 5413 at 7, Temmler Werke.

*Primary Examiner*—H. S. Cockeram
*Attorney, Agent, or Firm*—Richard A. Dannells, Jr.; Barry Moyerman

[57] ABSTRACT

Dialkylaminoalkylimidazoles having the formula

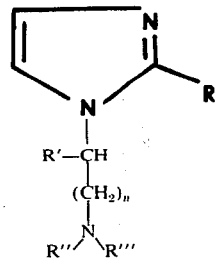

where
R and R' are independently selected from H and $CH_3$,
n is an integer from 1 to 2, and
R" and R'" are independently selected from $CH_3$ and $C_2H_5$ have been found to be useful in methods for preparing polyurethane compositions and for preparing thermoset resins.

4 Claims, No Drawings

DIALKYLAMINOALKYLIMIDAZOLES AS CATALYSTS FOR PREPARATION OF POLYURETHANES

This is a division, of application Ser. No. 347,039, filed Apr. 2, 1973 and now abandoned.

BACKGROUND OF THE INVENTION

1. Field of the Invention

This invention is directed to a novel class of compounds and to a method for their preparation. More particularly, the invention relates to dialkylaminoalkylimidazoles.

2. Prior Art

Imidazole and substituted imidazoles are well known in the art: see Erner, U.S. Pat. No. 3,177,223. References to aminoalkylimidazoles have been found, although to a lesser extent than the imidazoles; see Schipper et al.: Imidazoles and Condensed Imidazoles in: Elderfield, Heterocyclic Compounds, Volume 5, page 224, New York, Wiley, 1957. Most of the known aminoalkylimidazoles are of the histamine and histidine type where the aminoalkyl group is attached to a carbon atom of the heterocyclic ring. References to aminoalkylimidazoles where the aminoalkyl group is attached to the nitrogen of the heterocyclic ring are scarce; see Hoffman, U.S. Pat. No. 2,935,514. In the latter reference the aminoalkyl group is attached to the ring of a benzimidazole and not of the imidazole or alkyl imidazole structure.

SUMMARY OF THE INVENTION

In contrast to the prior art, the aminoalkyl group containing a tertiary nitrogen is attached to the nitrogen of either an imidazole ring or a lower alkyl substituted imidazole ring.

In accordance with the present invention, a dialkylaminoalkylimidazole is provided having the following formula:

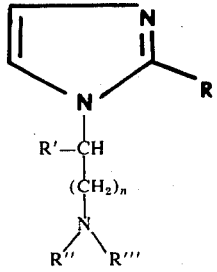

where
R and R' are independently selected from H and $CH_3$,
$n$ is an integer from 1 to 2, and
R'' and R''' are independently selected from $CH_3$ and $C_2H_5$.

Dialkylaminoalkylimidazoles have been synthesized from the imidazole precursor in accordance with the present invention by two different routes depending on the aminoalkyl group. Where the aminoalkyl group is a three carbon chain, the synthesis has been accomplished by cyanoethylating the imidazole or lower alkyl substituted imidazole, followed by hydrogenation and methylation. When the aminoalkyl group has only two carbons in the chain, the synthesis has been accomplished by a gas phase catalytic condensation of the imidazole with the appropriate dialkylaminoalkanol.

The dialkylaminoalkylimidazoles of the present invention have been found to be superior catalysts in the preparation of polyurethane compositions and epoxides. The activity of the catalyst surprisingly depends on the length of the alkyl chain separating the nitrogen of the heterocyclic ring from the tertiary nitrogen of the aminoalkyl group.

PREFERRED EMBODIMENTS OF THE PRESENT INVENTION

In one embodiment of the present invention, the dialkylaminoalkylimidazole is synthesized in the following manner:

a. reacting in the presence of a suitable solvent an imidazole having the formula

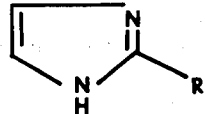

where R is H or $CH_3$ with acrylonitrile, b. hydrogenating the reaction product of step (a) in the presence of hydrogen and a suitable catalyst under elevated temperatures and pressures, c. removing the catalyst and solvent from the reaction product of step (b), d. distilling the resulting hydrogenated product of step (c), e. methylating the distillate from step (d), in the presence of formic acid and the appropriate aldehyde, e.g. formaldehyde or acetaldehyde, and f. recovering the dialkylaminoalkylimidazole.

The imidazole employed in the synthesis of the compounds of this invention can be prepared by any of the well known techniques, for example, by the reaction between alkylene diamine and an alkyl carboxylic acid as described in Erner, U.S. Pat. No. 2,847,417.

N,N-dimethylaminopropyl-2-methylimidazole can be synthesized, for example, according to the following scheme:

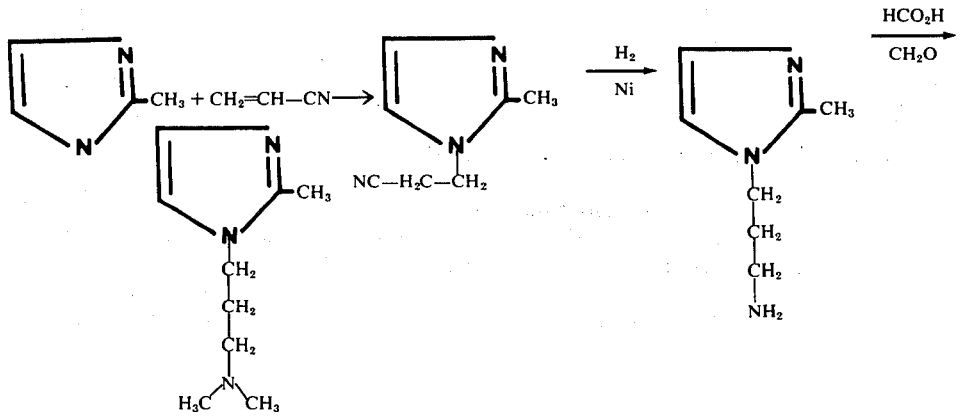

The cyanoethylating step of the foregoing reaction takes place in the presence of a primary, secondary, or tertiary alcohol at temperatures in the range of 50° to 100°C at 15 to 20 p.s.i. for a period of ½ to 6 hours.

N,N-dimethyldiethanolamine, N,N-dimethylisopropanolamine, and the like.

N,N-dimethylaminoethylimidazole can be synthesized according to the following route:

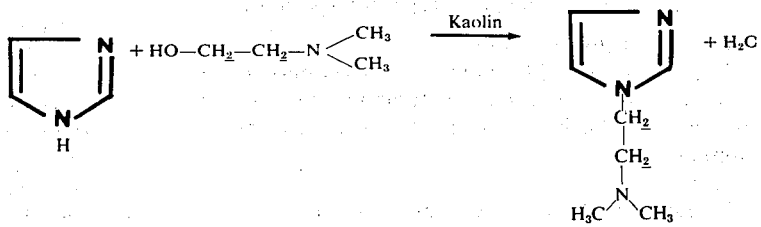

The hydrogenation step occurs at temperatures in the range of 40° to 150°C under 500 to 100 p.s.i. of hydrogen in the presence of a suitable catalyst such as Raney nickel catalyst. After the catalyst and solvent are removed from the hydrogenation reaction product, the residue is distilled under the following conditions of temperature and pressure: 100° to 110°C and 1.6 to 2.1 mmHg.

The methylation of the distillate takes place using a prior art method such as the Leuckhard Method using formic acid and the corresponding aldehyde; see H. T. Clark et al, Journal of American Chemistry Society, Volume 55, pages 4571 – 4587, 1933.

The methylated product is recovered by a separation step, e.g. vacuum distillation at 110°C and 1.6 mmHg.

In another embodiment of the present invention, the dialkylaminoalkylimidazole is synthesized in the following manner:

a. reacting in gas phase an imidazole having the formula:

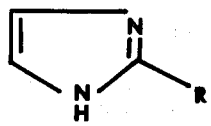

where R is H or CH$_3$
with an alkanolamine having the formula

where
R' is H or CH$_3$,
R'' and R''' are independently selected from CH$_3$ and C$_2$H$_5$
in the presence of an acidic catalyst such as kaolin or aluminum phosphate at elevated temperatures and recovering the dialkylaminoalkylimidazole.

The alkanolamines that are suitable starting materials for the foregoing embodiment include the following:

The reaction conditions for this reaction are temperatures in the range of 175° to 250°C and at substantially atmospheric pressure.

The dialkylaminoalkylimidazoles of this invention may be used as catalysts or activators for polyurethane formation by themselves or in combination with previously known activators particularly metal-organic compounds, such as tin octoate or dibutyl tin dilaurate. The imidazoles of this invention may be used to advantage in combination with other amine activators such as triethylenediamine or N-ethylmorpholine, particularly in the production of highly resilient polyurethane foams.

The polyurethane formulation where these compounds can be used consist of a compound which contains active hydrogen compounds and polyisocyanates. Compounds that contain active hydrogen atoms are those polyols having at least two active hydrogen atoms which display activity according to Zerewitinoff test as described by Kohler in J. of Am. Chem. Soc., Volume 49, page 3181, 1927.

Polyisocyanates which may be used as precursor material according to this invention are those known aliphatic, cycloaliphatic, araliphatic and aromatic polyisocyanates. Examples of these are the 2,4 and 2,6 toluene diisocyanate and mixtures thereof, bis-(4-isocyanate phenyl)-methane and higher molecular weight products produced by the phosgenation of aniline formaldehyde condensation products and the like.

Also a suitable starting material for the production of polyurethanes in accordance with the process of the present invention are the so-called prepolymers which are the reaction products of polyol, with excess polyisocyanates. Also to be included are the polymerized isocyanates containing isocyanurate rings.

The imidazoles of the invention can also be used in catalytic quantities for hardening various epoxy resins, epoxyNovalak resins, oxirane resins or epoxy isocyanate resins. They can be used in curing the abovementioned epoxy systems by themselves or in conjunction with conventional curing agents such as anhydrides, polyamides or dithiols.

The invention is further illustrated by reference to plurality of examples.

EXAMPLE 1

In a round bottomed flask were charged 8.6 grams of 2-methylimidazole, 50 cc of tertiary butanol, 5.3 grams of acrylonitrile and 0.5 grams of tetramethylammonium hydroxide. The flask was set in an oil bath and under a reflux condenser. The oil bath was heated from 60° – 80°C for 2 hours while the mixture was stirred by means of a magnetic stirrer. This mixture was then charged into a 300 cc autoclave and heated at 150°F under 1,000 p.s.i. of $H_2$ and in the presence of 3 cc of wet Raney nickel. The material took up 150 p.s.i. of $H_2$ after which the hydrogenation was stopped and the $H_2$ vented out. The Raney nickel was removed by filtration and the tertiary butanol solvent was removed on a Rotovac connected to house vacuum. The residue was then distilled at 110°C and 2 mm of Hg.

The distilled material was methylated by the Leuckhard method referenced above using formic acid and formaldehyde. The product was then distilled at 110°C and 1.6 mm/Hg. This product was analyzed by infrared (I.R.) and nuclear magnetic resonance (NMR) spectroscopy and was found to have the structure: N,N-dimethylaminopropyl-2-methylimidazole.

Analysis calculated for $C_9H_{17}N_3$: C, 64.76 wt. %; H, 10.18 wt. %; N, 25.15 wt. %. Found: C, 64.67 wt. %; H, 10.18 wt. %; N, 25.15 wt. %. Refractive Index (R.I.) at 20°C = 1.4920.

EXAMPLE 2

A mixture of 109 grams of Selectrofoam 6406 polyol, 1.5 grams of DC-193 surfactant, 47 grams of Genetron R-11SBA blowing agent and 0.8 – 1.2 grams of the tertiary amine catalysts listed in Table I below was stirred with a high speed mechanical stirrer for 10 – 15 seconds. To this mixture was added 105 grams of Hylene TIC diisocyanate and the mixture was stirred again with a high speed mechanical stirrer for 10 – 15 seconds then poured into a 5 quart tub. The cream time, gel time, rise time and tack free time for each formulation have been set forth in Table I below.

The results summarized in Table I indicate the superior activity of the product of Example 1 when compared to other well-known, highly active tertiary amine catalysts.

EXAMPLE 3

A polyurethane premix for highly resilient foam was prepared by mixing 95 grams of CP-4701 polyol, 5 grams Quadrol, 3 grams water and 0.8 – 1.4 grams of the amine catalyst of Table II below. This mixture was stirred with a high speed mechanical stirrer for 10 – 15 seconds then 63.4 grams of Mondur MR 105 isocyanate was added and the mixture was stirred again for 10 – 15 seconds then poured into a 5 quart tub. The cream, gel and rise times for the various formulations have been set forth in Table II below.

TABLE II

| Catalyst | Concentration in Grams | | | | | | | | | | | | | | |
|---|---|---|---|---|---|---|---|---|---|---|---|---|---|---|---|
| Imidazole | 0.8 | 1.0 | 1.4 | | | | | | | | | | | | |
| 2-Methylimidazole | | | | 0.8 | 1.0 | 1.4 | | | | | | | | | |
| N,N-Dimethylamino-methylimidazole | | | | | | | 0.8 | 1.0 | 1.4 | | | | | | |
| Dabco-WT | | | | | | | | | | 0.8 | 1.0 | 1.4 | | | |
| N,N-Dimethylamino-propyl-2-methyl-imidazole (Ex. 1 product) | | | | | | | | | | | | | 0.8 | 1.0 | 1.4 |
| Results | Time in seconds | | | | | | | | | | | | | | |
| Cream time | 39 | 35 | 33 | 41 | 37 | 35 | 40 | 38 | 36 | 35 | 33 | 30 | 33 | 30 | 26 |
| Gel time | 197 | 136 | 172 | 194 | 174 | 158 | 189 | 191 | 170 | 118 | 110 | 96 | 133 | 120 | 93 |
| Rise time | 385 | 354 | 285 | 367 | 320 | 270 | 423 | 390 | 350 | 180 | 168 | 147 | 235 | 207 | 158 |

The results summarized in Table II indicate the great improvement in catalyst activity in the preparation of polyurethanes using the product of the present invention over other imidazoles and that essentially the same activity is obtained to that achieved by Dabco – WT. This improvement is completely unexpected in view of the fact that N,N-dimethylaminomethylimidazole, a close homolog to the product of this invention, has significantly lower activity in the same formulation.

EXAMPLE 4

A flexible polyurethane premix was prepared by mixing 100 grams of CP-3000 polyol, 1 gram of DC-190 surfactant, 3.5 grams of water and 0.25 grams of 50 wt. % T-9 solution in CP-3000 and 0.15 grams of the amine catalyst of Table III below. The mixture was stirred with a high speed mechanical stirrer for 10 – 15 seconds and 43.5 grams of toluene diisocyanate 80/20 mixture was added. The mixture was stirred again for

TABLE I

| Catalyst | Concentration in Grams | | | | | | | | |
|---|---|---|---|---|---|---|---|---|---|
| Dabco R-8020 | 0.8 | 1.0 | 1.2 | | | | | | |
| Tetramethyl-1,3-butanediamine (TMBDA) | | | | 0.8 | 1.0 | 1.2 | | | |
| N,N-Dimethylaminopropyl-2-methyl imidazole (Ex. 1 product) | | | | | | | 0.8 | 1.0 | 1.2 |
| Results | Time in seconds | | | | | | | | |
| Cream time | 12 | 11 | 10 | 12 | 10 | 9 | 12 | 11 | 11 |
| Gel time | 63 | 49 | 42 | 62 | 48 | 41 | 58 | 48 | 42 |
| Rise time | 121 | 101 | 83 | 125 | 107 | 98 | 96 | 88 | 83 |
| Tack-free time | 145 | 122 | 91 | 157 | 130 | 111 | 122 | 103 | 99 |

10 – 15 seconds and poured into a 5 quart tub. Table III below summarizes the cream time, hard gel time, and the rise time for various amines used in this formulation.

TABLE III

| Catalyst | Concentration in Grams | | | |
|---|---|---|---|---|
| Imidazole | 0.15 | | | |
| 2-Methylimidazole | | 0.15 | | |
| N,N-Dimethylamino-methylimidazole | | | 0.15 | |
| N,N-Dimethylamino-propyl-2-methyl-imidazole (Ex. 1 product) | | | | 0.15 |
| Results | Time in seconds | | | |
| Cream time | 17 | 16 | 14 | 13 |
| Hard gel time | 160 | 146 | 144 | 135 |
| Rise time | 140 | 123 | 130 | 115 |

The results of Table III also indicate the significant improvement in catalyst activity obtainable by employing the product of this invention over other imidazoles.

EXAMPLE 5

A gas phase mixture of 50 wt. % imidazole and 50 wt. % N,N-dimethylethanolamine was preheated till it was completely in solution. The solution was then passed over a fixed bed of ⅛ inch pelleted kaolin (Kaopellets $^{TM}$) having a surface area of 145 sq. m/g. and a bulk density of 0.78 kg/l. at atmospheric pressure, a temperature of 300°C and a LHSV of 0.23. The product was isolated from the effluent by fractional distillation over an 80 plate theoretical column. The product was then distilled at 85°–87°C, 1.0 mm/Hg. The conversion of the reaction mixture was 62% by wt. based on the total amine consumed and the selectivity of the product based on total amine consumed was 53% by wt. This product was analyzed by I.R. and NMR spectroscopy and was found to have the structure: 1-(N,N-dimethylaminoethyl) imidazole.

Analysis calculated for $C_7H_{13}N_3$: C, 60.43 wt. %; H, 9.35 wt. %; N, 30.22 wt. %. Found: C, 60.45 wt. %; H, 9.55 wt. %; N, 29.65 wt. %. R.I. at 20°C = 1.4946.

EXAMPLE 6

A flexible polyurethane premix was made by blending 200 grams of polyol (Voranol CP-3000), 2.0 grams of silicone surfactant (L-548), 7.2 grams of water, 1.0 grams of a commercial tin catalyst (T-9 M&T) and 0.16 – 0.4 grams of N,N-dimethylaminoethylimidazole. To this blend was added 91.0 grams of toluene diisocyanate (80/20 wt. % mixture). The material was blended with a high speed mechanical stirrer for 10 –15 seconds and then poured into a five quart tub. Table IV below summarizes the cream time, hard gel time and rise time for the various levels of amine used.

TABLE IV

| Catalyst | | | | | |
|---|---|---|---|---|---|
| 1-(N,N-dimethyl-aminoethyl)-imidazole (Ex. 5 product), g. | 0.16 | 0.20 | 0.24 | 0.30 | 0.4 |
| Results | Time in seconds | | | | |
| Cream time | 23 | 20 | 19 | 16 | 14 |
| Rise time | 129 | 122 | 115 | 107 | 100 |
| Hard gel time | 132 | 127 | 122 | 115 | 107 |

EXAMPLE 7

In a small aluminum tray, separate portions of 10 grams of Epon 828 diglycidyl ether and 0.4 – 0.6 grams of an imidazole catalyst were blended with a hard wooden applicator for exactly one minute. The aluminum dishes were then floated on the surface of Nujol bath held at 85° ± 5°C. The time of gelation as indicated in Table V below was determined by probing the liquid resin with a hardwood applicator; gelation being that point at which the applicator comes out clean.

After gelation the Shore Hardness was determined in-situ according to ASTM Method D-31458. The values thus obtained are also indicated in Table V below.

TABLE V

| Formulation | A | B | C | D |
|---|---|---|---|---|
| EMI-24 g. | 0.4 | — | 0.6 | — |
| Dimethyl-aminoethyl-imidazole (Ex. 5 product),g. | — | 0.4 | — | 0.6 |
| Epoxy resin,g. | 10 | 10 | 10 | 10 |
| Time to gel at 85°C, min. | 23 | 18 | 15 | 13 |
| Shore D Hardness, hot after | | | | |
| 15 min. | — | — | 30 | 45 |
| 17 min. | — | — | 40 | 50 |
| 20 min. | — | 20 | 50 | 55 |
| 23 min. | 30 | 30 | — | — |
| 25 min. | 50 | 50 | — | — |

EXAMPLE 8

Into a ½ inch × ½ inch × 5 inch Teflon mold were hand casted separate blends of 150 grams Epon 828 and 3 grams of either EMI-24 or dimethylaminoethylimidazole. The molds were allowed to gel at room temperature and then they were post-cured at 120°C for two days. The resulting hardened bars were tested for compression strength. The gel time and the compression strength for the two molds are summarized in Table VI below.

TABLE VI

Gel Time and Compression Strength of Epon 828 Resin When Cured by Different Imidazoles

| Imidazole | Gel time, hours | Compressive Strength p.s.i. | Modulus p.s.i. |
|---|---|---|---|
| EMI-24 | 48 | 19,504 | 33 × 10$^4$ |
| 1-(N,N-di-methyl-aminoethyl)-imidazole (Ex. 5 product) | 35 | 18,678 | 32 × 10$^4$ |

The foregoing examples clearly shows that the effectiveness of N,N-dimethylaminoethylimidazole in curing epoxy resins is as good or better then the competitive hardener EMI-24.

What is claimed is:

1. In the method of preparing polyurethane compositions from formulations comprising at least one polyol having a minimum of two active hydrogen atoms per molecule, a reactive, organic polyisocyanate, and a catalyst, the improvement in which the catalyst comprises an effective activating amount of the dialkylaminoalkylimidazole of the formula

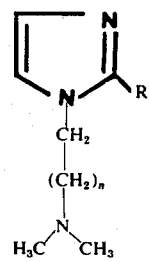

where

R is H or $CH_3$ and n is an integer from 1 to 2.

2. The method of claim 1 wherein said polyol is a polyether polyol.

3. The method of claim 1 wherein said polyol is a polyester polyol.

4. The method of claim 1 wherein said dialkylaminoalkylimidazole is employed in an amount of from about 0.05 to about 1.5 parts by weight per hundred parts by weight of polyol.

* * * * *